United States Patent [19]
Harris et al.

[11] Patent Number: 4,576,666
[45] Date of Patent: Mar. 18, 1986

[54] HEAT-RECOVERABLE ARTICLE

[75] Inventors: Richard J. Harris; Kenneth B. Pithouse, both of Wiltshire, England; Frans S. J. Van Dijck, Kessel-Lo, Belgium

[73] Assignee: Raychem Limited, Swindon, England

[21] Appl. No.: 640,723

[22] Filed: Aug. 14, 1984

[30] Foreign Application Priority Data

Aug. 16, 1983 [GB] United Kingdom ............... 8322004

[51] Int. Cl.⁴ ...................... B21F 15/06; B29C 27/20; B32B 1/08; B32B 1/10
[52] U.S. Cl. ...................................... 156/85; 112/418; 112/441; 138/155; 138/156; 138/177; 138/178; 156/86; 174/77 R; 174/84 R; 174/88 B; 174/DIG. 8; 285/373; 285/389; 285/423; 285/DIG. 10; 428/36; 428/102; 428/229; 428/349; 428/542.8; 428/913
[58] Field of Search ............ 174/84 R, 88 B, DIG. 8, 174/77 R; 138/155, 156, 177, 178; 285/DIG. 10, 373, 381, 423; 156/85, 86; 428/36, 349, 542.8, 229, 913, 102; 112/418, 441

[56] References Cited

U.S. PATENT DOCUMENTS

| | | | |
|---|---|---|---|
| 3,455,366 | 7/1969 | Ellis | 138/156 |
| 3,982,564 | 9/1976 | Clabburn et al. | 174/DIG. 8 |
| 4,342,800 | 8/1982 | Changani et al. | 428/36 |
| 4,366,201 | 12/1982 | Changani et al. | 155/86 |
| 4,425,174 | 1/1984 | McLoughlin | 156/85 |
| 4,451,311 | 5/1984 | Miyazaki et al. | 156/86 |
| 4,478,252 | 10/1984 | McLoughlin | 174/DIG. 8 |
| 4,496,410 | 1/1985 | Davis et al. | 156/85 |
| 4,498,938 | 2/1985 | Moisson et al. | 285/381 |

FOREIGN PATENT DOCUMENTS 0061695 10/1982 European Pat. Off.

Primary Examiner—James C. Cannon
Attorney, Agent, or Firm—T. Gene Dillahunty

[57] ABSTRACT

An article comprises two areas of heat-recoverable woven fabric which are joined together along a line by means of a mechanical joining arrangement, such as stitches, staples or a stitched or stapled zip, which penetrates the fabric. The direction of crimp of the area penetrated is substantially perpendicular to the line of the join, or the two areas have substantially parallel directions of crimp.

19 Claims, 3 Drawing Figures

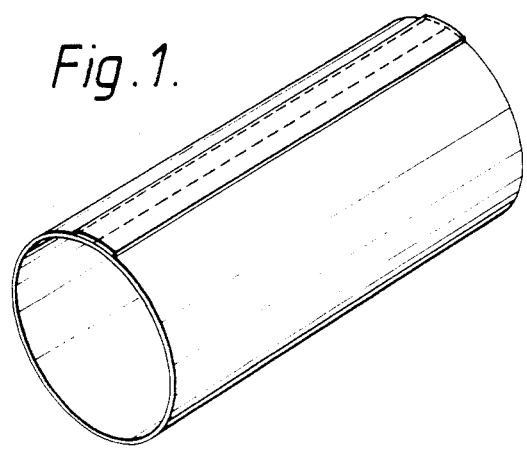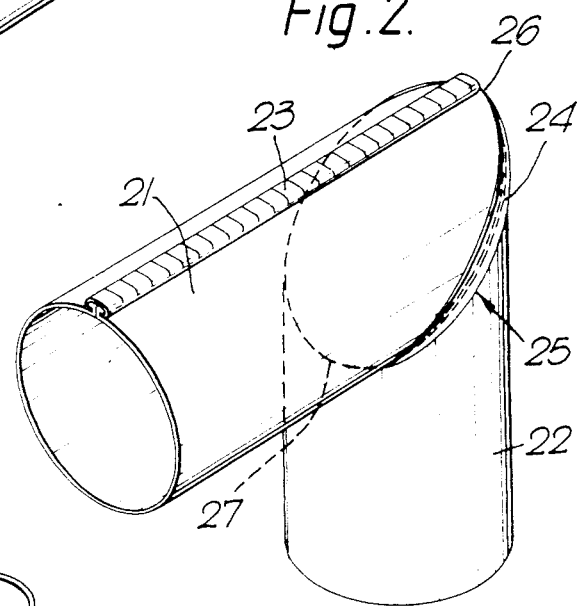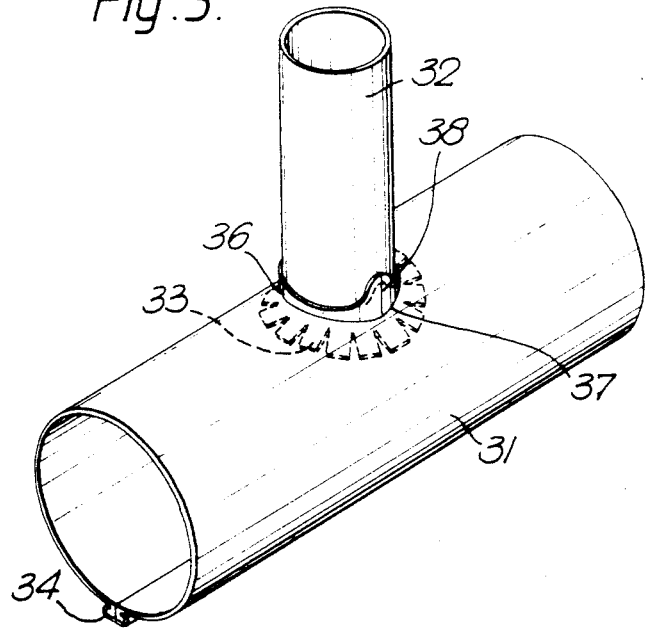

HEAT-RECOVERABLE ARTICLE

This invention relates to dimensionally heat-recoverable articles and especially to dimensionally heat-recoverable articles formed from heat-recoverable fabrics.

Recently a number of heat-recoverable articles which are based on fabrics have been devised and are the subject of copending British Patent Applications Nos. 8300217, 8300218, 8300219, 8300221, 8300222 and 8300223. The manufacture of heat-recoverable articles from fabrics containing heat-recoverable fibres has a number of advantages as compared with conventional heat-shrinkable products including ease of manufacture, since no subsequent expansion step is necessary, improved mechanical properties such as tensile strength, abrasion resistance and split resistance, and the ability to introduce very high strength heat stable fibres into the articles, all of which enable heat-recoverable fabrics to be employed in fields hitherto considered inappropriate for heat-shrinkable products.

British Patent Application No. 8300219 describes and claims a dimensionally heat-recoverable fabric which comprises fibres that will recover when heated to a recovery temperature thereof, wherein the recoverable fibres have a tensile strength of at least 0.1 MPa at their recovery temperature and have been stretched to an extent that will cause the fabric to recover by at least 40% when heated to the recovery temperature of the recoverable fibres.

British Patent Application No. 8300217 describes and claims a dimensionally heat-recoverable article for enclosing at least part of a substrate, which comprises a heat-recoverable fabric having fibres which will recover when heated and which have a tensile strength of at least 0.1 MPa at their recovery temperature, the fabric having an external surface that is coated with a layer of polymeric material of at least 0.3 mm thickness, the polymeric material being softenable when heated to accommodate recovery of the article without flowing.

Patent Application No. 8300218 describes and claims a dimensionally heat-recoverable article comprising a composite structure of a heat-recoverable fabric and a polymer matrix material, wherein:

(a) The heat-recoverable fabric comprises fibres that will recover when heated, the fibres having an axial recovery stress (Y) of at least $5 \times 10^{-2}$ MPa at a temperature above their recovery temperature; and (b) The polymer matrix material has an elongation/temperature profile such that there exists a temperature (T) which is at or above the recovery temperature of the fibres at which temperature the polymer matrix material has an elongation to break of greater than 20% and a 20% secant modulus (X) of at least $10^{-2}$ MPa (measured at a strain rate of 300% per minute), and at which temperature the inequality (1) is satisfied:

$$\frac{X}{Y} \cdot \frac{(1-R)}{R} \text{ is less than one} \quad (1)$$

wherein R is the mean effective volume fraction of heat-recoverable fibres in the composite structure along a given direction based on the total volume of the composite structure, or relevant portion thereof.

Patent application No. 8300222 describes and claims a recoverable article suitable for enclosing a contoured substrate and comprising a recoverable fabric having zones of different or uniformly varying recovery ratios or forces, such that on recovery the volume enclosed by the fabric changes shape to conform to the substrate.

Patent application No. 8300223 describes and claims a recoverable wraparound article which comprises a recoverable fabric cover portion, the fabric having a recovery ratio of at least 20%, and edge regions provided with a mechanical closure for maintaining the edge regions in proximate relationship during recovery of the cover portion.

Patent application No. 8300221 describes and claims an assembly for enclosing a junction between elongate substrates, which comprises:

(A) a sleeve comprising a recoverable fabric;

(B) means for rendering the fabric substantially impervious when the fabric is recovered, and (C) a relatively rigid liner for the sleeve, the liner having a central region of larger cross-section, and end regions of smaller cross-section which provide transitions from the central region to the substrate and which locate the liner with respect to the substrate.

In all these patent applications, and as used herein, the term "fibres" includes monofilaments as well as multifilament yarns, and in the preferred articles at least the heat-shrinkable fibres will be in the form of monofilaments.

According to one aspect, the invention provides an article comprising two areas of woven fabric, at least one of which being heat-recoverable, joined together along a line by means of a mechanical joining arrangement that penetrates at least one of the areas of fabric, said area of fabric penetrated having a direction of crimp that is substantially perpendicular to the line at least along part of the length of the line.

According to another aspect, the invention provides an article comprising two areas of woven fabric, at least one of which being heat-recoverable, joined together along a line by means of a mechanical joining arrangement that penetrates the two areas of fabric, the two areas of fabric having substantially mutually parallel directions of crimp along at least part of the line.

The invention also provides a method of encapsulating a substrate which comprises recovering into engagement with the substrate the article of the invention. The two areas of fabric may be joined before or after their positioning around the substrate.

The term "woven fabric" as used herein does not imply any method of production, but rather refers to the regular interlacing of its constituent fibres. Thus, "woven fabric" encompasses braids and other fabrics where fibres in one direction can (at least in the absence of crimp) pull through the fabric. By "direction of crimp" is meant the direction in which those fibres (either in the warp or in the weft in the case of a fabric made by weaving) that have the highest degree of crimp lie. The crimp of a fibre is a function of the deviation from a straight line which a fibre has to take in order to weave in and out of, i.e. interlace, the other fibres. Thus the crimp of a fibre may be defined as the difference in the distance between two points on a fibre in a fabric and the same two points on the fibre if it were removed from the fabric and straightened under a specific tension, expressed as a percentage of the distance between the points in the fabric.

Preferably the fibres in the direction of crimp have a degree of crimp of at least 10%, more preferably at least 20%, especially at least 30% and most especially at least 40% although it is unlikely that the fibres would have a crimp in excess of 60%, more usually 50%.

If desired it is possible to vary the degree of crimp in different regions or zones of the article. For example, with certain tubular article which are required to exhibit relatively high resistance to distortion in the radial direction, it may be necessary for the heat-recoverable fibres lying in the circumferential direction to have a relatively low degree of crimp. However, if the article has a join line extending axially along it, the circumferential heat-recoverable fibres in the region of the join line should have a relatively high degree of crimp. These conflicting requirements may both be achieved by "zoning" the properties of the fabric to form a fabric having heat-recoverable fibres of low crimp in all regions except those regions at the join line. Such a fabric may be formed by weaving the fabric using the heat-recoverable fibres as warp fibres and altering the warp tension at different times as the weave is formed. Alternatively fibres of higher titre and/or stiffness may be inserted at different positions either in the warp or in the weft in order to vary the crimp in the fibres perpendicular thereto.

It has been found that by employing weave designs in which the direction of crimp of at least one of the areas of fabric is substantially perpendicular to the line along at least part of its length, or by embodying weave designs in which the two areas of fabric have substantially parallel directions of crimp irrespective of the direction of the join line, it is possible to join areas of fabric together without those areas either pulling apart completely under the recovery forces of the recoverable fibres or without those parts of the fabric adjacent the join line from being distorted to such an extent that the integrity of the article is lost. The reason for the ability of the join to withstand the recovery forces of the article is not completely understood but it is believed to be due at least in part to the ability of the fibres extending perpendicularly to the join line to stretch on account of their relatively high degree of crimp thereby allowing the join line to shift laterally to some extent and thereby relieve the stresses on the join line. Alternatively, or in addition, a high degree of crimp in the fibres extending perpendicularly to the join line may increase the strength of the join by preventing those fibres lying between the join line and the edge of the fabric area from being stripped off the fabric.

By the term "substantially perpendicular" in connection with the crimp direction and the join line is meant an angle in the range of from 45° to 135°, preferably from 70° to 110° and especially from 80° to 100°, and by the term "substantially parallel" is meant an angle between two lines in the plane of the fabrics of less than 45°, preferably less than 20° and especially less than 10°. In addition it is often the case that the two areas of fabric extend from the join line in different planes in which case in the terms "parallel" and "perpendicular" should be construed as if that portion of the article were flattened to bring both areas of fabric into the same plane.

In certain forms of article according to the invention, for example where a tubular article is formed by joining opposed edges of a flat sheet, both the direction of crimp and the direction of recovery of the areas of fabric will coincide, and in the case of a tube will both be perpendicular to the line of the join. However, the invention allows more complex shapes to be formed, for example by joining together areas of fabric in which the direction of recovery are substantially perpendicular to one another. In such a case two different fabrics need to be used, one fabric having the crimp at least predominantly in the heat-recoverable fibres and the other fabric having the crimp at least predominantly in the heat-stable fibres.

In addition, it is not always the case that the join line will be a straight line but rather it may be curved so that the angle between the directions of recovery of the fabrics and also the angle between the directions of crimp of the fabrics may vary along the join line. In this case, at least at one point on the join line the direction of recovery of one of the fabrics will be perpendicular to the join line, at which point the direction of crimp of at least one fabric and preferably both fabrics is also perpendicular to the join line. This may be achieved by forming one of the fabrics with the direction of crimp always in the direction of recovery.

There is essentially no limit to the complexity of the structures that may be formed according to the invention. The articles may be made by relatively simple techniques involving weaving fabrics with the appropriate properties, cutting components of the articles from the fabrics and joining the components such that best use is made of the crimp directions and/or zones of different properties of the fabrics.

Any of a number of joining arrangements that penetrate the fabric may be used, e.g. staples and the like although for all aspects of the invention it is preferred for the areas of fabric to be joined together by one or more lines of stitches. Preferably, although by no means always, the areas of fabric that are joined overlap each other to form a lap joint. Preferably the, or each line of stitches, has from 200 to 800, especially from 300 to 600 and most especially about 400 stitches per meter. Alternatively, or in addition, it is preferred for the line of stitches or that line of stitches lying closest to an edge of the recoverable fabric to be separated by at least four rows of fibres. In order to reduce the possibility of breakage of heat-recoverable fibres by the stitching or sewing operation the sewing needles or staples used should be very sharp at their tips and have a maximum diameter of the same order of magnitude as the distance between the heat-shrinkable fibres of the fabric.

The mechanical joining arrangement may consist only of, say, staples or stitches. Alternatively, however, it may comprise stitches or staples together with a connecting means one part of which is attached (by means of the stitches or staples) to one of the areas of heat-recoverable woven fabric and another part of which is attached to the other area of fabric. The connecting means may be, for example, a zip, a web of material such as a heat-stable fabric or a sheet of generally non-perforate material.

Another advantage of the present invention, especially where the areas of fabric are joined by one or more lines of stitches but also to some extent where staples are used, is that when the heat-recoverable fibres are recovered their diameter or titre increases, the increase in titre corresponding to their reduction in length, so that the perforations in the fabric through which the stitches or staples pass close up and the fabric grips the staples or stitches, thereby increasing the strength of the join. The reduction in size of the perforations also helps any adhesive layer or layer of laminated polymer to fill the perforations completely and so reduce the possibility of leakage of fluids through the recovered article.

Preferred forms of the heat-recoverable fabrics are described in the British patent applications mentioned above. The heat-recoverable fibres are preferably formed from a polymeric material that imparts good physical properties and, in particular, good creep resistance to the fibres. Olefin polymers such as polyethylene and ethylene copolymers, polyamides, polyesters, acrylic polymers and other polymers capable of being cross-linked may be employed. A particularly preferred polymeric material for the fibres is based on polyethylene having a density of from 0.94 to 0.97 g/cc, an Mw of from $80 \times 10^3$ to $200 \times 10^3$ and Mn of from $13 \times 10^3$ to $30 \times 10^3$.

The fibres preferably have a minimum recovery stress of $10^{-1}$ MPa, more preferably $5 \times 10^{-1}$ and usually at least 1 MPa at a temperature above the transition temperature of the fibres. There is in theory no upper limit of recovery stress, but in practice 200 MPa and more usually 100 MPa is the highest figure normally achievable with polymeric fibres. The tensile strength of the fibres at their recovery temperature is preferably increased to 0.1 MPa or higher by cross-linking the polymeric material from which they are formed, either by chemical means or by irradiation e.g. high energy electron irradiation, gamma radiation or by ultra violet radiation.

When the fibre is cross-linked by irradiation it is convenient to incorporate the cross-linking step into manufacture of the fibre. The fibre can be extruded, stretched at a temperature below its melting temperature, preferably by an amount of from 800 to 200%, then subjected to irradiation to effect cross-linking. A less preferred way of making the fibre is to extrude the fibre, irradiate to cross-link, then heat the fibre, preferably to above its melting temperature, stretch the fibre, and then cool the stretched fibre. High density polyethylene fibres are preferably irradiated with a dose of from about 5 to about 35 megarads, preferably from about 5 to about 25 megarads, and in particular from about 10 to about 18 megarads. Usually the gel content of the cross-linked fibre is greater than 20%, preferably greater than 30%, most preferably greater than 40%. In practice, gel contents greater than 90% are not easily achievable.

Although it is usually preferred for the heat-recoverable fibres to exhibit a recovery of at least 20%, and especially at least 40%, particularly at least 80% such as 100% to 200%, in certain instances, for example where the article is intended to have a very high pressure retention capability, it may be desirable to allow the heat-recoverable fibres to recover by a low percentage only e.g. as low as 5%. The fabric before installation preferably recovers at least 40%, particularly by at least 50%, especially by at least 60%. A percentage recovery refers to a change in dimension based on the original dimension.

The fabric can be woven in a pattern, for example, twill, satin, sateen, Leno, plain, hop sack, sack, matt and various weave combinations in single or multiple ply weaves e.g. 2- or 3-ply weaves. Preferably the fabric is a woven fabric that has heat-recoverable fibres in one direction and dimensionally heat-stable fibres in the other directions so that the fabric as a whole is recoverable in a single direction only.

Whatever forms of fabric are used in the present invention it is preferred that they are laminated or impregnated, preferably to form a composite material, as described, for example, in British Patent Application Nos. 8300217 and 8300218 since, among other reasons, the presence of a laminated or matrix polymer increases the friction or adhesion between the fibres thereby strengthening the join. Also, if, as will usually be the case, the fabrics are laminated before the areas of fabric are joined together, at least one laminated layer of polymer will be sandwiched between two layers of fabric at the join and will help to seal the join against passage of fluid through it. The recovery that the composite material can exhibit will in general be less than that before lamination. Preferred possible extents of recovery of the composite material are at least 40%, especially at least 50%.

The matrix material is preferably cross-linked, for example by means of a chemical cross-linking agent or by irradiation. Where irradiation is used, a dose of 10 megarads or less, preferably 3-7 megarads, is preferred. We prefer that the composite material is produced by applying the matrix material to cross-linked fibres or fabric and then cross-linking the result.

The heat-recoverable article according to the invention has a wide variety of uses. For example it may be recovered over substrates, especially substrates having varying or discontinuous contours, to provide mechanical protection or protection from the environment. The fabric may employ heat stable fibres having high tensile strengths, e.g. glass fibres or fibres sold under the trade name "Kevlar" which, if laid in the axial direction of a radially heat-shrinkable tubular article enable the article to be used for example as a pipe coupling, the high strength heat-stable fibres providing the article with a high pull-out resistance. Whilst the fabric may be used alone, it is often advantageous for it to be employed in conjunction with an adhesive or sealant or other polymeric material that renders it substantially impervious to fluids, the adhesive, sealant or other material either being applied in situ when the fabric is installed or applied before sale of the fabric. Thus, for example, the fabric may be impregnated with a curable adhesive composition, e.g. a curable epoxy composition and especially an optionally b-staged epoxy resin that is cured by means of a polyamide, an anhydride or an isocyanate although other materials may be used such as phenolic resins or isocyanate/phenolic resin. The resin or other material may be laminated on to or impregnated into the fabric as mentioned above, or it may be employed in particulate form as described in U.K. patent application No. 82,24379. Alternatively an adhesive such as a hot-melt adhesive and especially an adhesive based on a polyamide or an ethylene-vinyl acetate copolymer may be applied either to the fabric or to the substrate during installation.

Most preferably, however, the heat-recoverable fabric is used in combination with a matrix polymer layer which softens when heated to accommodate recovery of the fabric. The combination thus forms a single composite structure.

The heat-recoverable fabric is preferably bonded to, and preferably embedded in, the polymer matrix material. At or above the recovery temperature of the fibres the polymer matrix material should be capable of limited flow under pressure so that it retains the integrity of the composite structure without substantially impeding recovery of the fibres. It preferably has, at the aforesaid temperature, an elongation to break of greater than 50%, most preferably greater than 100%, and a 20% secant modulus of preferably at least $5 \times 10^{31} \, 2$ MPa, most preferably at least $10^{-1}$ MPa, measured at a strain rate of 300% per minute.

The ability of the matrix material to flow when heated need not necessarily apply after recovery. Thus, for example, the polymer matrix material may eventually cure to a thermoset on heating, although it is preferred that the cure rate is sufficiently slow under the recovery conditions not to cause the material to drip off the fabric during the recovery of the fibres. Thus, for example, the polymer forming the matrix material may contain grafted hydrolysable silane groups which are capable of crosslinking the material subsequently in the presence of moisture. Examples of such materials are given in U.S. Pat. No. 1,286,460 to Dow Corning Ltd., the disclosures of which are incorporated herein by reference. Alternatively the matrix material may include a polymer, preferably a rubber and especially an acrylic rubber, which contains epoxy groups and a room temperature insoluble curing agent e.g. dicyandiamide. Preferred matrix materials are described in the patent applications referred to herein.

The impregnated fabric may also be provided with one or more adhesives, e.g. pressure-sensitive, hot-melt or curable adhesives or mastics. As an example it may be provided with a layer of a mastic on its central region and a strong adhesive, e.g. a hot-melt or curable adhesive, on its edge regions for example arranged as described in U.K. Patent Specification No. 2,108,625A.

The article of the invention is preferably such that the joining arrangement serves to hold the article in a hollow configuration, such as a tubular configuration or a bifurcated (including multiple branched) configuration. Such a hollow article can be used for encapsulating, thereby environmentally protecting or mechanically fixing, pipes and joints therein, and cables and bus bars and splices therein, such as splices in telecommunications and power cables. A bifurcated configuration may be useful for encapsulating the joints and splices referred to.

Three forms of article in accordance with the present invention will now be described by way of example with reference to the accompanying drawings in which:

FIG. 1 is a perspective view of one form of article according to the invention;

FIG. 2 is a perspective view of a second form of article; and

FIG. 3 is a perspective view of a third form of article.

Referring of FIG. 1 of the accompanying drawings, a tubular radially heat-shrinkable article is formed from a 2 up and 2 down twill employing 0.29 mm diameter high density polyethylene filaments in the warp and 75 E.C.G. glass fibre yarn in the weft. The fabric density (warp density/weft density, measured in fibres/2.5 cm) was 90/16. The fabric is irradiated with 1.5 MeV electrons to a dose of 15 Mrads to give the warp fibres a gel content of 37.3% (refluxing in xylene) and a 100% secant modulus of 0.60 at 150° C.

The fabric is then extrusion laminated with low density polyethylene at a melt temperature of 260° C. between a cooled metal roller and a rubber faced roller. The polyethylene has a thickness of 0.6 mm on one side of the fabric and a thickness of 0.3 mm on the other side and, after lamination, the composite is irradiated with high energy electrons to a further dose of 4 Mrads. The low density polyethylene used has a melt flow index of 3.0, a number average molecular weight Mn of 14,800 and a weight average molecular weight Mw of 114,800. During or after lamination the fabric was coated with a layer of a polyamide hot-melt adhesive.

The high density polyethylene fibres, which had been irradiated to a dose of 20 Mrads, had the following properties:

| | |
|---|---|
| 100% secant modulus at 150° C. | 0.29 MPa |
| tensile strength at 150° C. | 2.18 MPa |
| elongation to break at 150° C. | 780% |
| gel content (reflux in xylene) | 42.25% |
| recovery force | 0.62 MPa |
| recovery percentage | 87% |
| percentage crimp | 9% |

The fabric is cut and stitched along the edges parallel to the glass fibre yarn using two rows of "Kevlar" (trade name) sewing thread type T513, size 200/3/3 sold by duPont, as the stitch thread with 386 stitches per meter to form a lap joint. The stitch rows are spaced apart by 5 mm and are separated from each fabric edge by 12 mm. The tubular article may be used to enclose a joint between two pipes or similar substrates simply by sliding the article onto one of the substrates before coupling them then sliding the article over the joint and recovering it using a conventional hot-air gun or gas torch.

FIG. 2 shows a right-angled tubular article that is suitable for enclosing a right angled bend in a substrate for example in a bus-bar.

The article is formed initially as two component tubular parts 21 and 22. Part 21 is formed from the same fabric as that used for the article shown in FIG. 1 so that the direction of crimp is the same as the direction of the heat-recoverable fibres (i.e. circumferential). Component part 22 is formed from a 2 up 2 down twill using the same fibres as those used for part 21 but in which the heat-shrinkable fibres were inserted in the weft direction. The resulting fabric had a fabric density of 20/48 (warp density/weft density measured in fibres per 2.5 cm), and the pick-rate had been adjusted to give the heat-recoverable fibres in the circumferential direction a degree of crimp of about 3% and the heat-stable fibres in the axial direction a degree of crimp of 14%. Each of the component parts 21 and 22 may initially be formed from a flat fabric sheet which is formed into a tube by joining and stitching opposed edges of the sheet although it is preferable for one or both of the component parts to be provided with a rail-and-channel closure 23 or other closure as described in U.S. Patent application No. 8300223.

The two component parts 21 and 22 are joined together by means of two rows of stitches 24 to form a lap joint substantially as described above with reference to FIG. 1. In this article the relative directions of recovery of the two fabrics forming the component parts 21 and 22 will vary along the join line formed by the rows of stitches 24. At the regions 26 and 27 of the join line the join will be subjected to relatively little force between the different fabrics because, in those regions, the directions of recovery of both the component parts 21 and 22 are substantially parallel to the join line. In the region 25, the join line is subject to a relatively high recovery force, at least once the article has recovered into contact with the substrate, the recovery force of each component part has a significant vector component in the direction perpendicular to the join line. However, because the direction of crimp is parallel to the recovery direction in the component part 21 and perpendicular to the recovery direction in component part 22, the directions of crimp of the two component parts are substantially parallel to one another in the region 25 of the join line and therefore the row of stitches prevents the fabrics from being pulled apart.

FIG. 3 shows a heat-recoverable fabric suitable for enclosing a "T" branch in a substrate, e.g. a district heating pipe. The article is formed from two component parts 31 and 32, component part 31 being in the form of a wraparound article using a rail-and-channel type closure 34 as described in Patent application No. 8300223, and component part 32 being in the form of a tube that has been formed by joining together the opposed edges of a flat heat-recoverable fabric. The component parts have been joined by forming a hole in part 31, inserting part 32 through the hole, splaying out one end 33 of the component part 32, e.g. after cutting lines into the end 33 for a short distance and optionally inserting gussets therein, and then stitching the end 33 of component part 32 to the margin surrounding the hole in part 31. One row of stitches is employed using the same Kevlar fibres as the stitching thread with 386 stitches per meter. The row of stitches is spaced from the edges of each area of fabric by 8 mm.

The fabric forming part 31 is identical with that forming component part 21 of FIG. 2 and the fabric forming component part 32 is identical with that forming component part 22 of FIG. 2.

In this article, as with the article shown in FIG. 2, the relative directions of recovery of the two component parts will vary along the join line formed between the component parts. At points 36 the directions of recovery of both component parts will be parallel to the join line and so the join line will be subjected to a relatively low force tending to pull the fabrics apart. At point 37 the recovery forces of the two component parts 31 and 32 will act in mutually perpendicular directions and the recovery force of component part 31 acts in a direction perpendicular to the join line, so that a considerable strain is imparted on the join. However, at the point 37 the direction of crimp of the component parts is parallel and is perpendicular to the join line, thereby increasing the strength of the join.

If desired, the hole component part 31 may be so cut that the overlap between the component parts is increased at point 38 as shown, and also one or more additional lines of stitches may be employed. This increase in overlap further increases the strength of the join at point 37 along the join line.

The articles were tested in accordance with DIN Specification No. 30672 in which the articles were exposed to a salt fog for 24 hours and then tested for the presence of holidays (holes). All samples passed.

We claim:

1. An article comprising two areas of woven fabric, at least one of which being heat-recoverable, joined together along a line by means of a mechanical joining arrangement that penetrates at least one of the areas of fabric, said area of fabric penetrated having a direction of crimp that is substantially perpendicular to the line at least along part of the length of the line.

2. An article comprising two areas of woven fabric, at least one of which being heat-recoverable, joined together along a line by means of a mechanical joining arrangement that penetrates the two areas of fabric, the two areas of fabric having substantially mutually parallel directions of crimp along at least part of the line.

3. An article as claimed in claim 1, wherein along at least the said part of the line, the two areas of fabric have directions of recovery that are substantially perpendicular to one another.

4. An article as claimed in claim 1, wherein at least the said part of the line is substantially perpendicular to the direction of crimp of the areas of the fabrics.

5. An article as claimed in claim 1, wherein the two areas of fabric form part of different component parts of the article.

6. An article as claimed in claim 1, wherein the mechanical joining arrangement comprises one or more lines of stitches.

7. An article as claimed in claim 6, wherein the or each line of stitches has from 200 to 800 stitches per meter.

8. An article according to claim 6, wherein the mechanical joining arrangement additionally comprises a connecting means one part of which is joined to one of said areas and another part of which is joined to the other of said areas.

9. An article as claimed in claim 6, wherein the line of stitches, or a line of stitches lying closest to an edge of one of the areas of recoverable fabric, is separated from the edge of the recoverable fabric by at least four rows of fibres.

10. An article according to claim 1, wherein at least one of the areas of fabric can exhibit a recovery of at least 40%.

11. An article according to claim 1, wherein at least one of the areas of fabric and a matrix polymer form a composite material.

12. An article according to claim 1, wherein the joining arrangement serves to hold the article in a hollow configuration.

13. An article according to claim 1, wherein the joining arrangement serves to hold the article in a tubular configuration.

14. An article according to claim 1, wherein the joining arrangement serves to hold the article in a bifurcated configuration.

15. An article according to claim 1, wherein the article is coated on a surface thereof with a heat-activatable adhesive.

16. An article according to claim 1, when installed around a pipe, a cable, a joint in a pipe or a splice in a cable, a bus bar or a joint in a bus bar.

17. A method encapsulating a substrate which comprises recovering into engagement with the substrate an article according to claim 1.

18. A method according to claim 17, wherein said two areas are joined together after their positioning around the substrate.

19. A method according to claim 17, wherein the substrate comprises a pipe, a joint in a pipe, a cable or a splice in a cable, a bus bar or a joint in a bus bar.

* * * * *

UNITED STATES PATENT AND TRADEMARK OFFICE
CERTIFICATE OF CORRECTION

PATENT NO. : 4,576,666

DATED : March 18, 1986

INVENTOR(S): Richard J. Harris et al.

It is certified that error appears in the above-identified patent and that said Letters Patent are hereby corrected as shown below.

In column 1, lines 10 and 11, "8300217, . . . and 8300223." should read --2,139,142A, European patent application no. 0116393, UK nos. 2,133740A, 2,135,836, 2,133,639A and 2,134,334--;

line 22, "8300219" should read --2,133,740A--;

line 31, "8300217" should read --2,139,142A--;

line 41, "8300218" should read --European patent application no. 0116393--; and line 65, "8300222" should read --2,133,639A--.

In column 2, line 3, "8300223" should read --2,134,334--.

In column 3, line 25, "embodying" should read --employing--.

In column 5, line 29, "200%" should read --2000%--;

line 60, "directions" should read --direction--; and line 66, "8300217 and 8300218" should read --2,139,142A and European patent application no. 0116393--.

In column 6, line 64, "5 x $10^{31}$ 2 MPa" should read --5 x $10^{-2}$ MPa--.

In column 8, lines 44 and 45, U.S. Patent application No. 8300223" should read --U.K. Patent 2,134,334--.

UNITED STATES PATENT AND TRADEMARK OFFICE
CERTIFICATE OF CORRECTION

PATENT NO. : 4,576,666
DATED : March 18, 1986
INVENTOR(S) : Richard J. Harris et al.

It is certified that error appears in the above-identified patent and that said Letters Patent is hereby corrected as shown below:

In column 9, line 6 "8300223" should read -- 2,134,334 --.

Signed and Sealed this

Fourteenth Day of October, 1986

[SEAL]

*Attest:*

DONALD J. QUIGG

*Attesting Officer*    *Commissioner of Patents and Trademarks*